(12) United States Patent
Allemand et al.

(10) Patent No.: US 6,178,034 B1
(45) Date of Patent: Jan. 23, 2001

(54) ELECTROCHROMIC DEVICES

(75) Inventors: Pierre M. Allemand, Tucson, AZ (US); Randall F. Grimes, Ann Arbor, MI (US); Andrew R. Ingle, Tucson, AZ (US); John P. Cronin, Tucson, AZ (US); Steve R. Kennedy, Tuscon, AZ (US); Anoop Agrawal, Tucson, AZ (US); Jonathan M. Boulton, Tucson, AZ (US)

(73) Assignee: Donnelly Corporation, Holland, MI (US)

( * ) Notice: Under 35 U.S.C. 154(b), the term of this patent shall be extended for 0 days.

(21) Appl. No.: 09/155,601

(22) PCT Filed: Apr. 9, 1997

(86) PCT No.: PCT/US97/05791

§ 371 Date: Jun. 23, 1999

§ 102(e) Date: Jun. 23, 1999

(87) PCT Pub. No.: WO97/38350

PCT Pub. Date: Oct. 16, 1997

Related U.S. Application Data
(60) Provisional application No. 60/015,223, filed on Apr. 10, 1996.

(51) Int. Cl.[7] .............................. G02F 1/15; G02F 1/153
(52) U.S. Cl. ........................... 359/265; 359/269; 359/270
(58) Field of Search ..................... 359/265, 266, 359/267, 269, 270, 272, 273, 274

(56) References Cited

U.S. PATENT DOCUMENTS

| | | | |
|---|---|---|---|
| 4,236,792 | * 12/1980 | Bissar | 359/272 |
| 4,253,741 | * 3/1981 | Nakauchi et al. | 359/272 |
| 4,297,006 | * 10/1981 | Bissar | 359/272 |
| 4,304,465 | 12/1981 | Diaz | 350/357 |
| 4,435,408 | 3/1984 | Kamimori et al. | 350/357 |
| 4,550,982 | * 11/1985 | Hirai | 359/272 |
| 4,669,830 | * 6/1987 | Hottori et al. | 359/272 |
| 4,749,260 | 6/1988 | Yang et al. | 350/357 |
| 5,042,923 | 8/1991 | Wolf et al. | 359/275 |
| 5,078,480 | 1/1992 | Warszawski | 359/265 |
| 5,189,549 | 2/1993 | Leventis et al. | 359/271 |
| 5,215,684 | 6/1993 | Okabayashi et al. | 252/582 |
| 5,215,821 | 6/1993 | Ho | 428/432 |
| 5,239,406 | 8/1993 | Lynam | 359/275 |
| 5,293,546 | 3/1994 | Tadros et al. | 359/269 |
| 5,300,374 | 4/1994 | Agawal et al. | 429/192 |
| 5,402,144 | 3/1995 | Ripoche | 345/105 |

FOREIGN PATENT DOCUMENTS

| | | |
|---|---|---|
| 2268595 | 12/1994 | (GB) . |
| 63-106730 | 5/1988 | (JP) . |
| 63-106731 | 5/1988 | (JP) . |
| 5-80357 | 4/1993 | (JP) . |

OTHER PUBLICATIONS

Anderson, A.M., et al., "An Electrochromic $Li_xWo_3$/polymerlaminate/$Li_yV_2O_5$ Device", Large Area Chromogenics: Materials and Devices for Transmittance Control, PSIE Institute Series vol. IS4, pp. 471–481 (1990).

Nagai, J., et al., "Polymeric Ion Conductors", Large–Area Chromogenics: Materials and Devices for Transmittance Control, PSIE Institute Series vol. I 54, pp. 378–401 (1988).

* cited by examiner

*Primary Examiner*—Ricky Mack
(74) *Attorney, Agent, or Firm*—Fitzpatrick, Cella, Harper & Scinto

(57) ABSTRACT

An electrochromic device is disclosed having a selective ion transport layer which separates an electrochemically active material from an electrolyte containing a redox active material. The devices are particularly useful as large area architectural and automotive glazings due to there reduced back reaction.

43 Claims, 2 Drawing Sheets

ELECTROCHROMIC DEVICES

This application is a 35 U.S.C. §371 of PCT/US97/05791, filed Apr. 9, 1997, which claims the benefit of U.S. Provisional Application No. 60/015,223, filed Apr. 10, 1996.

This invention was made in part with government support under grant No. DE-FC36-95G010069 awarded by the Department of Energy. The United States government has certain rights in the invention.

BACKGROUND OF THE INVENTION

1. Field of the Invention

This invention relates to electrochromic (EC) devices which can vary the transmission or reflectance of electromagnetic radiation by application of an electrical stimulus to the EC device. In particular, the EC devices of this invention employ a selective ion transport layer in combination with an electrolyte containing at least one redox active material to provide excellent device response and stability.

2. Related Prior Art

Electrochromic devices are well known. Such devices are described, for example, in U.S. Pat. No. 4,435,408 (an electrochromic device comprising a pair of transmissive electrodes having disposed therebetween an electrochromic material and an electrolyte layer containing a non-liquid material of an adhesive or tacky high polymer and a material having a coordinating function); GB2268595 (an electrochromic device comprised of a substrate bearing an electrode followed by an electrochromic layer, an electrolyte layer containing a cation doner material and a counter electrode on a second substrate); JP 63-106731 (an EC device comprising mutually opposing electrode plates having therebetween an electrochromic material layer and an electrolyte consisting of either a lactone organic solvent or an organic solvent containing S=0, a cation source, a polymer for gelling the electrolyte and at least one kind of ferrocene compound acting as a redox agent) and JP 63-106730 (an EC device comprising mutually opposing electrode plates having therebetween an electrochromic material layer and an electrolyte including an organic solvent having S=0, a quinone compound and/or a ferrocene compound as a redox agent and an iodine compound).

There are many potentially useful applications for EC devices. For example, they may be employed in glazings, e.g., energy efficient and/or privacy windows for architectural or automotive use, automotive rearview mirrors, displays, filters and other applications where variable light transmission is desired.

A typical prior art window device is illustrated in FIG. 1 having substrates (e.g., glass) 10 and 15, transparent conductors 20 and 25 (e.g., indium tin oxide or doped tin oxide), electrochromic layer 30 (e.g., tungsten oxide, molybdenum oxide or polyaniline), and an electrolyte 40. The electrolyte layer may consist of at least one redox active species and at least one dissociable acid, lithium salt or the like, such as disclosed, for example, in copending U.S. application Ser. No. 08/547,678, entitled "Electrochromic Devices", filed Oct. 24, 1995, and copending U.S. application Ser. No. 08/330,090, entitled "Electrochromic Device with Improved Processability and Methods of Preparing the Same", filed Oct. 26, 1994.

As noted above, electrochromic devices of the prior art undergo a change in electromagnetic radiation transmission after the application of an electrical stimulus. For example, if the EC device illustrated in FIG. 1 used tungsten oxide as an electrochromic layer 30, then when an appropriate potential is applied to the device, the redox material in the electrolyte 40 would be oxidized at the electrolyte 40/transparent conductor 25 interface which would cause a simultaneous reduction in the tungsten oxide by the injection of ions and electrons into the electrochromic layer 30. However, the oxidized species can typically migrate to the electrolyte 40/tungsten oxide 30 interface and undergo a reduction to its original form, thus resulting in a steady back reaction.

As a result of this steady back reaction, typically an EC device must remain exposed to the electrical potential used to reach a desired transmissive state in order to maintain that state of transmission. If the electrical stimulus is removed, then generally over time the EC device will return to the transmissive state it held prior to application of the electrical stimulus, i.e., the rest state. Such devices are said to have a short memory. Indeed, if the back reaction is significant, then with increasing area of the device it is more difficult to maintain a uniform transmissive state, e.g., uniform coloration, over the entire area of such a device.

While some applications may benefit from a large back reaction in electrochromic devices, such as rearview automotive mirrors, other applications may require reduced or no back reaction in the low transmission state. For example, EC devices employed as architectural or automotive glazings, e.g., automotive sunroofs, would benefit from reduced back reaction since a glazing could be left in a low transmission or darkened state without the need for constant voltage application.

Several techniques have been adopted in an attempt to enhance the memory of EC devices. For example, Anderson, A. M., et al., "An Electrochromic $Li_xWo_3$/polymerlaminate/$Li_yV_2O_5$ Device", Large-Area Chromogenic: Materials and Devices for Transmittance Control, SPIE Institute Series Vol. IS4, pp. 471–481 (1990), describes an electrochromic window device comprised of two pieces of conductive glass with complementary electrochromic coatings connected by a transparent polymeric ion conductor. This publication describes EC devices where an additional coating, i.e., a "counter coating" is deposited on a transparent conductor, such as transparent conductor 25 shown in FIG. 1. This counter coating is in contact with the electrolyte. However, the electrolyte is only an ion conducting medium and contains no redox active species. Moreover, the EC device of this publication requires that either the electrochromic layer or the counter coating layer must be pre-reduced, i.e., ionic intercalated, to a specific degree to control the device contrast in a desired range. In addition, the two coatings, i.e., the electrochromic coating and the counter coating, have to be electrochemically matched for the desired performance. Because of these requirements, the assembly of such EC devices is generally cumbersome and expensive.

A device that remains in a low transmissive state in the rest state is disclosed in copending application Ser. No. 08/547,578, entitled "Electrochromic Devices", filed Oct. 24, 1995. However, this device utilizes the continuous application of electrical power to the device to remain in the high transmissive state, e.g., the bleached stated.

JP 5-80357 discloses an electrochromic device allegedly having an improved memory comprising two opposing electrodes having disposed therebetween an electrochromic material layer and an electrolyte layer separated by an ion conducting barrier layer. The ion conducting layer is preferably a metal, such as a metal oxide or metal halide. This publication does not disclose an electrolyte layer containing a redox active material and thus requires rather large voltage applications which are deleterious to the long term stability of an EC device.

An object of this invention is to provide improved electrochromic devices, particularly relatively large area devices such as architectural and automotive glazings, which are stable, durable and have an enhanced memory.

SUMMARY OF THE INVENTIONS

This invention is related to an electrochromic device comprising a conducting electrode opposing a counter electrode with (i) an electrochemically active material layer, (ii) a selective ion transport layer and (iii) an electrolyte containing at least one redox active material, wherein (i), (ii) and (iii) are sequentially disposed between said conducting electrode and said counter conducting electrode. At least one of the electrodes is transparent. The invention further relates to the electrochromic device described above disposed between a first substrate and a second substrate, wherein at least one of the substrates is transparent.

The EC devices of this invention are particularly advantageous for use as large area architectural and automotive glazings which benefit from the inhibition of back reaction, and thus can be activated to a low transmissive state without the requirement of continuous electrical stimulation to maintain that state of low transmission.

These and other objects, aspects, features and advantages of the present invention will become apparent from the following detailed description of the preferred embodiment taken in conjunction with the accompanying drawings.

DESCRIPTION OF THE PREFERRED EMBODIMENTS

The present invention is directed to electrochromic devices which may be employed, for example, in architectural glazings or vehicular rearview mirrors or glazing. The device of this invention has a conductive electrode opposed to a counter conductive electrode with a layer of electrochemically active material, a layer of selective ion transport material and an electrolyte containing at least one redox active material disposed between the conductive electrodes. At least one of the electrodes is transparent. It is preferable that the present invention further comprise a first transparent substrate that is disposed on the outwardly facing surface of a transparent electrode and a second substrate disposed on the outwardly facing surface of the other electrode. Both substrates and electrodes of the EC device of this invention are transparent when the EC device of this invention requires complete visual transmission, such as in the case of a window or glazing.

Figure 1:
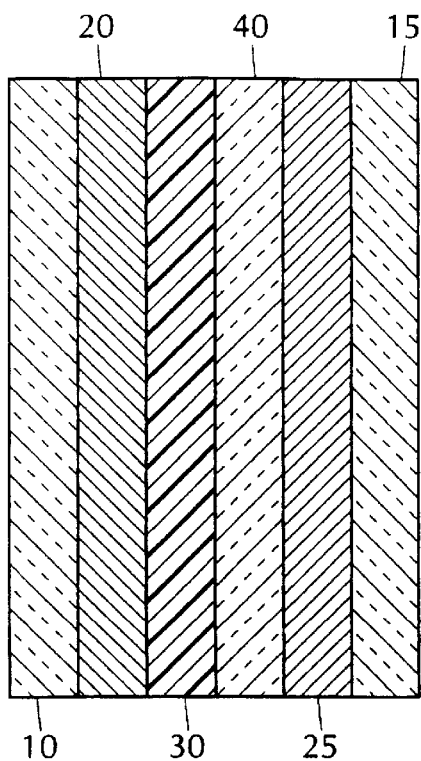
FIG. 1 is a schematic view of a prior art EC window device.
Figure 2:
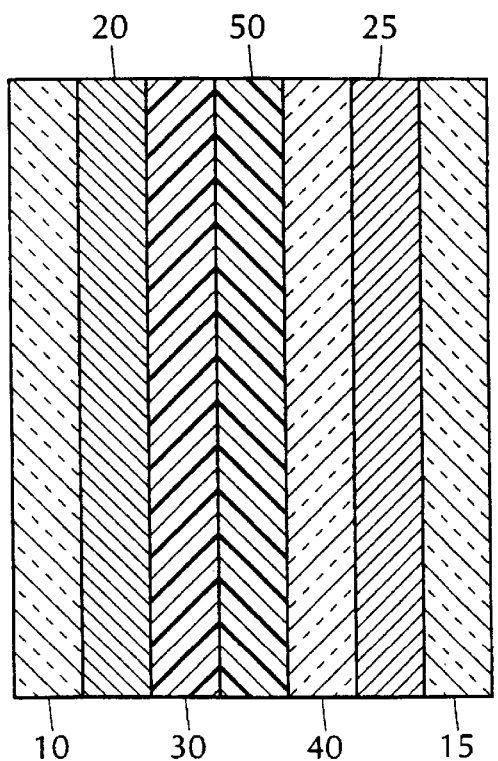
FIG. 2 is a schematic view of an EC window device according to this invention.

FIG. 2 illustrates an example of an EC window device of this invention having transparent conducting electrodes 20 and 25 coated, respectively, on the opposing surfaces of transparent substrates 10 and 15. A layer 30 of electrochemically active material is disposed on the inward facing surface of electrode 20. A selective ion transport layer 50 separates electrolyte 40 from electrochemically active material layer 30.

Typically the substrates 10 and 15 of the EC device illustrated in FIG. 2 are transparent glass or plastic such as, for example, acrylic, polystyrene, polycarbonate, allyl diglycol carbonate [CR39 available from PPG Industries, Pittsburgh, Pa.], SAN [styrene acrylonitrile copolymer], poly(4-methyl-1-pentene), polyester, polyamide, etc. It is preferable for the transparent substrates 10 and 15 to be either clear or tinted soda lime glass, preferably float glass. If plastic is employed, it is preferably abrasion protected and barrier protected using a hard coat of, for example, a silica/silicone antiabrasion coating, a diamond-like protection coating or their like, such as is well known in the plastic glazing art. Generally, the substrates have a thickness in the range of about 0.01 mm to about 10 mm, and preferably in the range from about 0.1 mm to 5 mm. However, any substrate of any thickness which will provide a functioning EC device may be employed.

The transparent substrates 10 and 15, both glass and plastic, may have a coating or a bonded film on the outward facing surface. This coating may be an antireflection coating, an antifogging coating, an antiabrasion coating, an ultraviolet absorber coating and mixtures thereof. The substrates may have a coating, tape or lamination which is an antilacerative, an antiscatter, a colored (by absorption or reflection), an ultraviolet blocking or an IR blocking (by absorption or reflection) coating, tape or lamination or mixtures thereof. It is also possible to employ transparent substrates which are specific colored substrates, photochromic substrates, infrared absorbing substrates, reflecting substrates, ultraviolet absorbing substrates and mixtures thereof.

The conducting electrodes 20 and 25 may be of the same or different material and can have different conductivities. At least one of the conducting electrodes must be transparent, although when the EC device is a window device as shown in FIG. 2 then both conducting electrodes 20 and 25 must be transparent. The materials employed for the conducting electrodes are well known to those skilled in the art. Exemplary conducting electrode materials are coatings of doped indium oxide, doped tin oxide, doped zinc oxide, ruthium oxide and the like, as well as all thin metallic coatings that are substantially transparent, such as those of gold, silver, aluminum, nickel alloy, and the like. It is also possible to employ multiple layer coatings, such as those available from Libbey Owens Ford (LOF) under the tradename of TEC-Glass® or those available from PPG Industries under the tradenames SUNGATE® 300 and SUNGATE® 500. The preferred sheet resistance of these conductive coatings should be below 100 $\Omega/\square$, most preferably below 25 $\Omega/\square$.

The TEC-Glass® and SUNGATE® conductive coated glass comprises a multi-layer thin film structure, which includes a thin coating of fluorine-doped tin oxide with additional undercoating thin film layers disposed between the fluorine-doped tin oxide layer and the underlying glass substrate. This structure inhibits reflected color and increases light transmittance resulting in a non-iridescent glass structure having a low haze (typically less than 5%). The multi-layer coating stack is made from an on-line (preferably in-bath) pyrolytically-coated (preferably by chemical vapor deposition) float glass. The layers undercoating the doped tin oxide typically comprise a silica/silicone layer and a tin oxide layer.

Preferably, the transparent conducting electrode used in this invention is a thin layer of ITO ($In_2O_3$ containing preferably approximately 5 to 20 mole % of $SnO_2$). Typically, the conducting electrodes 20 and 25 are disposed on a substrate of glass or plastic as a coating and the coating has a thickness in the range of about 5 nm to about 10,000 nm, and preferably about 10 nm to about 1,000 nm. However, any thickness of the conducting electrode coating may be employed that provides adequate conductance for the EC device and which does not appreciably interfere with the transmission of light where required.

The transparent conductors 20 and 25 may be composite conductors prepared by placing highly conductive ceramic and metal wires or conductive layer patterns on one of the faces of the substrate and then overcoating this with transparent conducting materials such as ITO and doped tin oxides. These overlayers may be patterned in the form of highly conductive underlying patterns or as continuous coatings. One such overlayer is described in U.S. Pat. No. 5,293,546, the disclosure of which is incorporated by reference herein. Alternatively, the highly conductive paths could be placed over the continuous coating of the transparent conductor.

The electrochemically active material 30 which may be employed in the present invention are well known to those skilled in the art. These include inorganic, organic or blends and composites of inorganic and organic electrochemically active materials. Exemplary inorganic metal oxide electrochemically active materials include $WO_3$, $V_2O_5$, $MoO_3$, $Nb_2O_5$, $TiO_2$, $CuO$, $Ni_2O_3$, $Ir_2O_3$, $Cr_2O_3$, $Co_2O_3$, $Mn_2O_3$, mixed oxides (e.g., W—Mo oxide, W—V oxide) and the like.

The electrochemically active organic materials useful in this invention are generally polymers which possess electrochromic properties and are typically electronic conductors or semiconductors. A wide range of electrochemically active polymers is known to those skilled in the art. Exemplary electrochemically active polymers useful in the instant invention include, without limitation, polyphenylene vinylenes, polythienylene vinylenes, polyalkoxythienylene vinylenes, polyfurylene vinylenes, polythiophenes, polyisothianaphthenes, polyanilines, polyarylamines, polyindoles, polypyrroles, polyalkoxyphenylenes, polyphenylenes, polyperinaphthalenes, polynaphthylamines, polyvinylmetalocenes, carbon clusters (fullerenes) and carbon cluster containing polymers, polyimides, polyviologens. Other electrochemically active polymeric materials which may be employed in the present invention include, without limitation, derivatives of the aforementioned polymers, such as those prepared by sulfonation or substitution, copolymers, blends and composites, where the matrix may be organic or inorganic but at least one of the components is from the polymers or their derivatives described above. Some typical examples of these composites and blends are polyaniline or polypyrrole with prussian blue, polyaniline with phthalocyanine and/or sulfonic acid containing polymers and polyaniline in a metal oxide matrix, such as $SiO_2$, $TiO_2$, $ZrO_2$, $V_2O_5$, $WO_3$ and the like.

The preferred electrochemically active materials of the present invention are polyaniline and its derivatives, $WO_3$ and $WO_3$ doped with oxides of lithium, sodium, potassium, molybdenum, vanadium or titanium. The electrochemically active material may further comprise tinting materials, heat stabilizers, spacers, UV absorbers/stabilizers and adhesion promoting agents, such as coupling agents, which, for example, may be silane coupling agents, titanium coupling agents, zirconium coupling agents, and the like.

The electrolyte 40 can be solid or liquid. The electrolytes which may be employed in this invention are known and either are readily available or can be prepared by those skilled in the art. An exemplary electrolyte of the present invention is propylene carbonate which contains a redox active material such as, for example, a viologen salt.

The electrolyte 40 contains a redox active material which itself can be a salt (e.g., a viologen) or a nonsalt (e.g., ferrocene). Additionally, electrolyte 40 may contain a separate ionic source, such as, for example, tetraethylammonium perchlorate (TEAP), phosphoric acid, lithium salts (e.g., $LiClO_4$, $LiBF_4$, $LiCF_3SO_3$, $Li[N[SO_2CF_3]_2]$), sodium salts and mixtures of various ionic sources well known to those skilled in the art. One manner of forming the electrolyte, for example, is by dissolving a viologen salt in propylene carbonate (PC). In addition, a dissociable salt, such as a soluble lithium salt, may be added to the solution.

Suitable solvents for the electrolyte may be selected from acetonitrile, 3-hydroxyproprionitrile, methoxypropionitrile, 3-ethoxypropionitrile, 2-acetylbutyrolactone, propylene carbonate, ethylene carbonate, glycerine carbonate, tetramethylene sulfone, cyanoethyl sucrose, γ-butyrolactone, 2-methylglutaronitrile, N,N'-dimethylformamide, 3-methylsulfolane, glutaronitrile, 3,3'-oxydipropionitrile, methylethyl ketone, cyclopentanone, cyclohexanone, benzoyl acetone, 4-hydroxy-4-methyl-2-pentanone, acetophenone, 2-methoxyethyl ether, triethylene glycol dimethyl ether, 4-ethenyl-1,3-dioxalane-2-one, silicon/polyol co-polymers, (such as those available from Genesse Polymers, Flint, Mich.), 1,2-butylene carbonate, glycidyl ether carbonates (such as those commercially available from Texaco Chemical Company, Austin, Tex.) and combinations thereof, preferred of which include propylene carbonate.

Monomers with the appropriate polymerization initiators can be utilized as the monomer composition so that this composition can be in-situ polymerized after the cell has been filled by radiation, heat, or electrogenerated initiators to form a solid electrolyte. Such processes are described, for example, in co-pending U.S. patent application Ser. No. 08/023,675, filed Feb. 26, 1993 and co-pending U.S. patent application Ser. No. 08/193,557, filed Feb. 8, 1994, both of which are hereby incorporated by reference as if their disclosure were fully set forth herein.

Regardless of the procedure followed, the electrolyte can consist of other additives, e.g. tinting materials, water, UV stabilizers/absorbers, heat stabilizers, infrared absorbing dyes, moisture scavengers, fillers, viscosity modifiers, etc. If an opaque electrolyte is desired, such as in display applications, then the electrolyte will generally contain at least one additive selected from the group consisting of inert inorganic oxide fillers, inorganic sulfate fillers, inorganic carbonate fillers, inorganic pigments, organic pigments, surfactants and dispersing agents. The electrolyte 40 can consist of a UV absorber, and the device can be oriented in use such that incident light passes through layer 40 before layer 30. This will cause the UV radiation component to be absorbed before the light reaches the polymer 30. Thus, devices can be fabricated where UV sensitive polymers are used in layer 30. An example is a window configuration where layer 40 faces the light source, e.g. the sun, during use. Another possibility is a UV-stable rearview mirror where layer 40 is used to attenuate the UV before the light reaches layer 30.

The UV spectral characteristics of the device of this invention can be tailored by using more than one UV stabilizer. For example, UV stabilizers available under the tradenames Uvinul® 3000 and Uvinul® 3050 from BASF Corporation could be used either alone, or, for example, in a 1:1 mixture.

Although many materials known to absorb ultraviolet radiation may be employed herein, preferred ultraviolet stabilizing agents include "UVINUL" 3000 [2,4-dihydroxybenzophenone (manufactured by BASF Corp., Wyandotte, Mich.)], "UVINUL" 3049 [2,2'-dihydroxy-4,4'-dimethoxybenzophenone (BASF Corp.)], "UVINUL" 3035 [ethyl-2-cyano-3,3-diphenylacrylate (BASF Corp.)], "UVINUL" 3039 [2-ethyl hexyl-2-cyano-3,3'-diphenylacrylate (BASF Corp.)], "UVINUL" 3040 [2-hydroxy-4-methoxybenzophenone (BASF Corp.)], "UVINUL" 3008 [2-hydroxy-4-octoxy-benzophenone (BASF Corp.)], "TINUVIN" P [2-(2H-benzotriazole-2-yl)-4-methylphenyl (manufactured by Ciba Geigy Corp., Hawthorne, N.Y.)], "TINUVIN" 327 [2-(3',5'-di-t-butyl-2'-hydroxyphenyl)-5-chloro-benzotriazole (Ciba Geigy Corp.)], "TINUVIN" 328 [2-(3',5'-di-n-pentyl-2'-hydroxyphenyl)-benzotriazole (Ciba Geigy Corp.)], "CYASORB" UV 24 [2,2'-dihydroxy-4-methoxy-benzophenone (manufactured by American Cyanamid Co., Wayne, N.J.)], monobenzoates (available from Eastmann Chemicals, Kingsford, Tenn. and Sandoz Chemical Corp., Charlotte, N.C.), resorcinol monobenzoates, formamidines (available from Givaudan-Roure, Clifton, N.J.), phenylformamidine and combinations thereof, hindered amine light stabilizers such as those available from BASF, where a suitable range of the ultraviolet stabilizing agents is from about 0.2% (w/v) to about 40% (w/v), with about 5% (w/v) to about 15% (w/v) being preferred. The ultraviolet stabilizing agent should be chosen with an eye toward avoiding an adverse affect on performance and electrolyte function.

In addition, ultraviolet absorbing layers may be coated onto, or adhered to, the first substrate and/or second substrate, and preferably the substrate closest to the source of UV radiation, to assist in shielding the electrochromic device from the degradative effect of ultraviolet radiation. Suitable ultraviolet absorbing layers include those recited in U.S. Pat. No. 5,073,012 entitled "Anti-scatter, Ultraviolet Protected, Anti-misting Electro-optical Assemblies", filed Mar. 20, 1990, the disclosure of which is incorporated by reference herein.

Examples of such layers include a layer of DuPont BE1028D which is a polyvinylbutyral/polyester composite available from E. I. DuPont de Nemours and Company, Wilmington, Del., and SORBALITE™ polymeric UV blockers (available from Monsanto Company, St. Louis, Mo.) which comprise a clear thin polymer film with UV absorbing chromophores incorporated, such as by covalent bonding, in a polymer backbone. The SORBALITE™ clear thin polymer film when placed on a surface of the substrate closest to the source of UV radiation (such as the sun), efficiently absorbs UV light below about 370 mm with minimal effect on the visible region. Thickness of the SORBALITE™ film is desirably in the range of about 0.1 microns to 1000 microns (or thicker); preferably less than 100 microns; more preferably less than about 25 microns, and most preferably less than about 10 microns. Also, UV absorbing thin films or additives such as of cerium oxide, iron oxide, titanium oxide, mixed oxides or such oxides with dopants can be used to protect the electrochromic device from UV degradation. Such UV absorbing layers may also contain tinting materials and IR blocking materials.

The device may also consist of an IR absorber dye such as Epolite dyes (e.g., Epolite® 3-125, Epolite® 5-63) available from Epolin Corp, Newark, N.J.

For protecting EC devices from UV and/or infrared radiation, the devices may be constructed by using substrates that are laminated. For example two glass substrates can be laminated together by using a thermoplastic or a thermoset polymer film. One of the outer surfaces of this lamination will have the electrically conductive coating which is employed as an electrode in the EC device. The polymer used for lamination could consist of UV blocking and/or IR blocking materials that are described above. Some examples of polymers which are used for lamination are poly-vinyl butyral, acrylics, polyurethanes, epoxies and ethyl vinyl acetate based copolymers. An IR blocking or reflecting property may also be imparted by coating these substrates with multiple thin coatings by using interference phenomena. Principles of such coatings are set forth in *Thin Film Optical Filters* by H. A. Mcleod, McGraw Hill Publishing Co., 1989, the disclosure of which is incorporated by reference herein.

The selective ion transport layer substantially prevents the oxidized species in the electrolyte 40 from contacting reduced electrochromic material layer 30. The layer does, however, have a sufficient ionic transport property to allow ions, such as $H^+$, $Li^+$, $Na^+$ and the like, to migrate through the selective ion transport layer to compensate for the charge injected or extracted from the underlying electrochromic layer 30. Thus, layer 50 must only allow selective ion transport.

Selective ion transport means that layer 50 will have higher rates of migration for those ions that are required to intercalate the electrochromic material layer 30, and lower rates of migration for other neutral species or ions, particularly those that are formed by the oxidation or reduction of the redox active species contained in layer 50. Preferably, selective ion transport layer 50 has low or no electronic conductivity.

Inclusion of the selective ion transport layer in the EC devices of this invention advantageously provides a device having a reduced leakage current, i.e., back reaction. Preferably the leakage current is less than 100 $\mu A/cm^2$, more preferably less than 10 $\mu A/cm^2$ and most preferably less than 1 $\mu A/cm^2$ for the EC devices of this invention.

The selective ion transport layer can be organic, inorganic or a combination of organic and inorganic material, such as a polyceram. Preferred, exemplary, inorganic selective ion transport materials include hydrated or non-hydrated oxides such as those of tantalum, aluminum, silicon, titanium, niobium, cerium or the like. The oxides may be mixtures of such oxides together or with oxides of other materials. The oxides may also be doped. If desired, such hydrated or non-hydrated oxides may also contain cations such as lithium, sodium, potassium, magnesium and the like. An exemplary source of lithium ions includes lithium niobate, lithium tantalate, lithium silicate and the like. It is also possible to fabricate coatings from inorganic selective ion transport materials based on fluorides, nitrites and phosphates. Many of these materials show preferable ionic transport, for example, towards $H^+$, $Li^+$ and $Na^+$. A number of inorganic selective ion transport materials are described in Truong, V., et al., "Inorganic Ion Conductors", Large-Area Chromogenics: Materials and Devices for Transmittance Control, SPIE Institutes, Vol. IS4, pp. 386–400 (1990), the disclosure of which is incorporated by reference herein.

The inorganic selective ion transport layers can be deposited by any suitable method known for depositing inorganic coatings. Representative methods are wet chemical methods, chemical vapor deposition and physical vapor deposition (e.g., sol-gel, metallo-organic decomposition, laser ablation, evaporation, e-beam assisted evaporation, sputtering, plasma enhanced PVD and CVD and the like).

Organic selective ion transport materials, i.e., those that will conduct the selected ions as described above, are often described as ion-conducting polymers or polymeric ion conductors. Such compounds are described, for example, in Nagai, J., et al., "Polymeric Ion Conductors", Large-Area Chromogenics: Materials and Devices for Transmittance Control, SPIE Industries, Vol. IS4, pp. 378–385 (1990), and U.S. Pat. No. 5,300,374, the disclosure of both of which are incorporated by reference herein. Other polymers that may be employed as organic selective ion transport materials include, for example, polystyrene sulfonic acid, poly 2-acrylamido-methylpropane-sulfonic acid, Nafion (available from Du Pont Chemical Co., Wilmington, Del.) and polymers prepared from silyl terminated polypropyleneoxide (available form Kaneka America Corp., New York, N.Y.). The portions in the acid functionality of these polymers may be partially or completely exchanged with other cations (such as $Li^+$, $Na^+$, $K^+$, $Ca^{++}$, $Zn^{++}$ and the like) to yield their salts.

These polymers may also be copolymers where they contain the ion-conductive moieties such as sulfonic acid and their salts. These copolymers may also contain reactive, functional groups, e.g., silane moieties with reactable alkoxy and/or hydroxy groups which can be used for cross-linking and improving the adhesion of the polymer coating to oxide surfaces. Such materials are described in U.S. Pat. No. 5,032,455, the disclosure of which is incorporated by reference herein. It is not necessary for these materials to only show cationic transport. They may also be chosen from those polymers that transport anions. Examples of such materials are poly(diallydimethylammonium chloride), poly (diallydimethylammoniumtetrafluoroborate or poly (diallydimethylammoniumtriflate).

Non-ionic polymers may also show selective transport properties and thus may be useful in the selective ion transport layers. Some examples include polyvinylbutyral and acrylics such as Sorbalite™ available from Monsanto Company, St. Louis, Mo.

These polymeric selective ion transport layers can be deposited from a liquid medium. If these layers are being deposited on an electrochemically active layer of tungsten oxide it is preferred that the liquid medium be acidic or neutral and able to solubilize the polymer. Some solvents that are preferred for depositing on tungsten oxide are acids, water and polar solvents such as alcohols. These may also be mixed together. Preferred acids are formic acid and acetic acid and a preferred alcohol is ethanol. The solvent is then evaporated leaving the polymeric film. This evaporation may be done under ambient or at an elevated temperature. Surfactants may be used in these systems to improve wetting and coating uniformity. Suitable surfactants include for example, nonionic, cationic and anionic surfactants, with Triton® from Union Carbide, Danbury, Conn. being an exemplary preferred surfactant.

Selective ion transport layers can also be made from polycerams. These networks consist of both organic and inorganic groups. These are typically synthesized and deposited by utilizing sol-gel techniques which are well known to those skilled in the art. The network forming precursors for these materials are usually more than one which are selected from alkoxides of metals (e.g. silanes/silyated derivatives) and organic oligomers (e.g., based on polyethyene oxide, polypropylene oxide, their co-polymers, glycols, etc.). Catalysts and accelerators may also be used to promote the reactions amongst these precursors. Such materials and their processing are described in several references, including for example, "Design of Hybrid Organic-Inorganic Materials Synthesized via. Sol-Gel Chemistry, by C. Sanchez and F. Ribot, Presented at the First European Workshop on Hybrid Organic-Inorganic Materials, Chateau de Bierville, France 1993; "Chemistry of Inorganic-Organic Polymers (Organically Modified Silicates)", by H. Schmidt and B. Seiferling, Proceedings-Materials Res. Symposium, Vol 73, 1986, p-739; and "Organic/Inorganic Hybrid Network Materials by the Sol-Gel Approach", by J. Wen and G. L. Wilkes, Chemistry of Materials, 1996, Vol. 8, p 1667. Useful silanes for preparing selective ion transport layers are those having covalently bonded anionic or cationic moieties. Particularly useful compounds are sulfonato-organosilanol compounds, as described in U.S. Pat. No. 4,267,213, the disclosure of which is incorporated by reference herein.

If the polyceram or inorganic oxide selective ion transport layers are deposited by wet chemical methods various curing catalysts can be incorporated into the coating solution. Many catalysts are known to those skilled in the art, e.g. those described in U.S. Pat. No. 4,390,660, the disclosure of which is incorporated by reference herein. Examples include alkali metal salts of carboxylic acids, such as sodium acetate, potassium formate, and the like, amine carboxylates, such as dimethylamine acetate, ethanolamine acetate, dimethylaniline formate, and the like; quaternary ammonium carboxylates, such as tetramethylammonium acetate, benzyltrimethylammonium acetate and the like; metal carboxylates, such as tin octoate; metal alkoxides and their chelated derivatives, such as titanium (iv) iso-propoxide aluminium di(iso-propoxide) acetoacetic ester chelate, amines, such as triethylamine, triethanolamine, pyridine, amino silanes and the like; and alkali hydroxides, such as sodium hydroxide, lithium hydroxide, ammonium hydroxide, and the like.

The medium to deposit the selective ion transport layer may have additives to promote adhesion and ion transport. Other additives that may be employed in the selective ion transport layer include plasticizers, UV stabilizers, salts (e.g., lithium salts) dyes and fillers such as described previously for the electrolyte layer.

Besides selective ion transport, which inhibits back reaction for the EC devices of this invention, the selective ion transport layer 50 can also be employed, if desired to prevent photo-chemical, electrochemical, physical or chemical reactions that may take place between the electrolyte 40 and the electrochromic layer 30, thus also enhancing device durability. This invention can be used in conjunction with other methods of controlling the back reaction and the potential in the center of the device by making changes in electrolyte 40. Some of these methods include, changing the concentration and the type of ingredients (such as salt, redox material, solvent, plasticizer, type of polymeric and other additives), thickness of the layer, viscosity of the layer, dielectric constant of the layer, etc. The voltage drop can be reduced by increasing the conductivity of at least one of the layers 20 and 25 and changing the busbar geometry. An example of a busbar geometry change should be by putting these around the outer periphery of both the conductors 20 and 25 as opposed to only on one of the opposing edges of a rectangular device. In this geometry, precaution should be taken to avoid a non-desirable electrical short between the busbars on the two substrates. The busbars may be soldered, adhesively bonded or spray, vacuum, electrochemically, or chemically (e.g., electroless deposition of metals) deposited. They may be even made out of conducive adhesives and ceramic powders (e.g. conductive frits).

Polyaniline and many of its derivatives, which are the preferred electrochemically active polymeric materials of this invention, are transparent and almost colorless in the reduced state and when oxidized change to green and then to a blue color with further oxidation. When a viologen salt is dissolved in PC, it is colorless in its oxidized state. Therefore, when polyaniline is used as the coating material in layer 30, it is preferred that both components, i.e., the polyaniline coating 30 and the electrolyte 40, be in the transparent state.

The EC window device shown in FIG. 2 may be prepared, for example, as follows. First, an electrochemically active material such as polyaniline or tungsten oxide may be used as layer 30. A selective ion transport layer 50 can be deposited on layer 30 using physical and chemical vapor deposition methods (including plasma assisted processes) and chemical methods such as thermal or solvent casting, polymerization or sol-gel methods. A lithium ion conductor containing a redox active species may be employed as the electrolyte 40. A typical lithium ion conductor can be a liquid or solid. For example, a liquid lithium ion conductor can be made by dissolving a lithium salt into a polar solvent such as propylene carbonate. It is preferred, to employ two conductive substrates, for example, glass coated with doped tin oxide, doped zinc oxide, doped indium oxide, which have surface resistivities preferably below 100 $\Omega/\square$. Indium oxide doped with tin and tin oxide doped with fluorine are available commercially. The latter is also sold under the trade names TEC-Glass® and SUNGATE® from Libbey Owens Ford (LOF) and PPG Industries, respectively. The electrochemically active coating, e.g., polyaniline, is deposited on the conductive side of one of these substrates. This can be done by chemical or electrochemical methods, which are known to those skilled in the art. The former is easily scalable to large-area substrates and amenable to commercial production at low costs. In the chemical method, a polyaniline is typically mixed in a liquid and then the liquid mixture is contacted with the substrate such as by casting, spinning, roller applying, spraying, dipping, or by similar wet chemical means. As the liquid evaporates, if an electrochromically-inert reducing agent is not present, then a green-blue color coating is left behind which, when left in air, continues to oxidize to a more blue color. Typically, the thickness of this coating will be between 10 $\mu$m and 10,000 nm. Next, a selective ion transport material is coated on to the electrochemically active coating using one of the processes previously described. The advantage of the liquid casting process is low capital costs and the ability to make the coatings with mixed cations to tailor the optical, chemical, electrochemical or physical properties. After both coatings are obtained, i.e., the electrochemically active layer and the selective ion transport layer, a cell is constructed such that the coatings are in the interior of the cell. If the electrolyte ion conductor is a solid, then a lamination process can be used, or a hollow cavity with a predetermined thickness can be formed that can be filled by the liquid electrolyte or ion conductor. The electrolyte ion conductor formulation can be used in the liquid form or, depending on the composition, it can be converted into a solid by reactions that may be assisted by radiation or heat or both. The construction and general assembly of mirrors and glazings are well known as disclosed, for example, in U.S. Pat. Nos. 5,066,112 and 5,239,406, the disclosure of both of which are incorporated by reference herein as if fully set forth.

For liquid electrolytes, the cell can be constructed in the following way. The electrochemically active material/selective ion transport material coated substrate is adhered together at the edges with another conductively coated substrate by an adhesive or sealant (forming a seal), preferably with a slight offset to attach the conductive busbars and/or conducting leads. The separation between the substrates is maintained by putting spacers (such as microbeads, cylinders, etc.) either in the adhesive or between the two plates or by both methods. The space may also be maintained by stops such as tapes, shims, etc. Typically, the thickness of the cavity is in the range of 1 micrometer to 10,000 micrometers, although the preferred range is between 10 and 1000 micrometers and the most preferred is 50 to 500 micrometers. The area of the coatings that comes in contact with this edge sealant may have to be chemically modified so that good adhesion and a seal is obtained. Sometimes it may be necessary to chemically deposit (or modify) this area on the conductive substrate before putting down any of the electrochemically active coating 30 for obtaining good sealing characteristics. One may even remove the coatings, in full or partly, from this area before cell fabrication and then chemically treat this with modifiers, e.g., coupling agents, to improve adhesion. A good seal is important to form a device that will withstand the environment and have a long, useful life. Coupling agents, e.g., those based on silanes, aluminates, titanates, zirconates, etc. may be used including those such as indium and/or tin reactive sites to enhance adhesivity to ITO and tin oxide transparent conductors. One may also add these materials to the adhesives directly. The adhesives may also consist of fillers, stabilizers, colorants, etc. to enhance their appearance, physical and chemical properties. The adhesive may be organic, inorganic, thermoplastic, thermosetting, solventless or solvent-containing, or even double-sided tapes and adhesives that may be activated by temperature, radiation, etc.

The resulting cell may be backfilled by procedures such as described in the U.S. Pat. No. 5,140,455, the disclosure of which is incorporated by reference as if fully set forth herein. That patent also describes a two-hole filling procedure which may be used if so desired. We have discovered that the cavity can also be filled by a capillary method. In this method, two holes at the two opposite ends of the cell are required. One of these holes is then submerged into the electrolyte. The other hole remains at the highest end of the cell. The cell starts to fill by a capillary action, and the air or inert gas [nitrogen, argon or their like] in the cell is expelled at the other (high) end. To obtain a good cell without any air or gas pockets, the parameters such as the size of the holes, cavity thickness, cell size, amount of cell to be submerged, etc., must be optimized. One may even assist this process by a positive pressure on the electrolyte after submerging one end of the cell.

The cell may also be filled using the method and apparatus disclosed in U.S. provisional application 60/015,224 entitled "Method And Apparatus For Filing The Cavities Of Cells And Laminated Substrates With A Fluid", the disclosure of which is incorporated by reference herein as if fully set forth.

If a solid electrolyte is desired one could commence with a monomer composition that could be polymerized by radiation (e.g., UV, IR microwave, etc.) or by elevating the temperature further. The preparation of a solid electrolyte can be readily achieved by those skilled in the art.

A liquid electrolyte may be modified to reduce or eliminate flow under quiescent conditions by adding viscosity modifiers. Such preferred modifiers are those that result in physical crosslinks and/or entanglements. Some inorganic examples of these are fumed oxides based on silicon and aluminum. These materials are available from Degussa Corp. (Ridgefield Park, N.J.) and Cabot Corporation (Tuscola, Ill.). The electrochromic devices of this invention may be employed as architectural glazings, vehicular glazings, vehicular mirrors, as displays and as filters in displays or monitors.

Typically, EC devices are colored or bleached by applying power as a function of time (potential or current that is also dependent on the desired level of transmission or reflection). These devices could be used in applications where a large temperature change may take place in the ambient conditions, e.g., architectural and automotive glazing (e.g., sunroofs) products. The optimum power (e.g. voltage) to be applied to the EC device (for desired kinetics, level of coloration and longevity) may be dependent on the temperature. The choice of materials used to make the device will determine the extent to which the operational voltage will be sensitive to the temperature. Thus, it may be desirable to place temperature sensors to measure or estimate the temperature of the EC cell and provide this information to the power applying circuitry.

These device could also be coupled with radiation sensors (e.g., visible and solar) and energy management systems to automatically control their transmission/reflection. An example of a computerized control system for buildings called TABS™ was recently announced by NETMEDIA® Inc. (Tuscon, Ariz.). This and other climate control systems for autos and buildings could be adapted for EC windows.

The devices of this invention may be powered with solar cells, thermoelectric sources, wind generators, etc., to make them self-sustaining. These may be also coupled into charge storage devices such as batteries, re-chargeable batteries, capacitors or other means. The charge storage devices could be utilized as automatic backup power source when primary source of power is interrupted. One such use can be for EC automobile glazings (including sunroofs) where it is desired to color these while the automobile is running using the main car battery, and then to maintain the coloration while parked without any energy consumption from the main car battery. The device could also be operated using only the backup power source if the automobile is not operational and they could also be useful to provide for the current to compensate for any back reaction that may be taking place to keep the device colored to the desired level. Power could also be conserved by using a sleeper circuit in conjunction with the devices of this invention. For example, an EC device of this invention used as an automotive sunroof could be programmed to shut down after the automobile is not used for some predetermined time, e.g. 2 hours, 10 hours, 24 hours, etc., to avoid the possibility of battery drain during a prolonged period of nonuse. The predetermined time may be selected by user if desired.

The devices of this invention may also be used as filters in displays or monitors for reducing the ambient light intensity, e.g., sun glare, that is falling on the monitor or display surface. Thus, the device may be employed to enhance the image quality of displays and monitors, particularly in well lit conditions.

These EC devices may also be used as displays having an advantageously wide viewing area with a high contrast because no polarizers are required as in conventional liquid crystal displays In addition, EC display devices having an ion selective transport layer do not require continuous power to continually display a constant image, unlike liquid crystal devices and EC devices lacking memory. Power is only necessary when the display information needs to be changed. Thus, an EC display device of this invention may be advantageously employed in such applications as price displays in supermarkets, gas stations, instruments and the like with the benefit of reduced power consumption.

The construction of display devices is well known, such as disclosed, for example, in U.S. Pat. Nos. 5,189,549 and 5,078,480, the disclosure of both of which are incorporated by reference herein.

The devices of this invention may also be used as eyewear or sunglasses. The construction of electrochromic eyewear is well known, such as disclosed, for example, in U.S. Pat. Nos. 5,455,637 and 5,455,638, the disclosure of both of which are incorporated by reference herein.

The Examples which follow are intended as an illustration of certain preferred embodiments of the invention, and no limitation of the invention is implied.

Comparative Example 1

$WO_3$ Electrode and Ferrocene Electrolyte

A 3×3 in. piece of conductive doped tin oxide coated glass was coated with a thin film of $WO_3$ by a sol-gel method such as described in copending U.S. application Ser. No. 08/386,771, filed Feb. 10, 1995, the disclosure of which is incorporated by reference herein. Two small holes were drilled in the opposite corners of a second 3×3 in. piece of TEC20 glass. A cell was assembled by sealing these two substrates at the edges with an epoxy glue containing 210 $\mu$m glass bead spacers with the coatings facing inwards. The substrates, having the same dimensions, were slightly offset to provide for a place to anchor the electrical leads. This assembly process was carried out under ambient atmosphere and the epoxy was thermally cured in an oven at 120° C. for one hour in air. The cell was then hot filled with an electrolyte consisting of a propylene carbonate (PC)/sulfolane (TS) mixture (60:40) containing 0.05 molar (M) ferrocene, 0.01 M lithium perchlorate ($LiClO_4$), 0.05 M lithiumtetrafluoroborate ($LiBF_4$), and 10 wt % polymethylmethacrylate (PMMA) with an inherent viscosity of 1.38 deciliter/gram (about 540,000 grams/mole molecular weight) at room temperature. The filling holes were plugged with an UV curable glue or a room temperature curing epoxy.

A potential of +1.3 V was applied to the device (the negative lead being connected to the Tungsten oxide coated electrode) causing its transmittance (measured at 550 nm) to change from 76% T to 5.5% T in about 90 seconds. The steady state current in the colored state was 9 mA for an area of 45.5 $cm^2$ (198 $\mu A/cm^2$). When the power source was disconnected, the device's transmission went back from 5.5% T to 76% T in about 90 seconds.

EXAMPLE 1

$Ta_2O_5$ Overcoated $WO_3$ Electrode and Ferrocene Electrolyte

A similar device was made as described in comparative example 1, but the $WO_3$ electrode was overcoated with a thin film of tantalum (V) oxide ($Ta_2O_5$). The $Ta_2O_5$ precursor solution was prepared by dissolving 1.3 milliliters of tantalum ethoxide in 30 milliliters of dry ethanol and 1.13 milliliters of 2,4-pentanedione as a complexing agent. This solution was stirred under an inert atmosphere for two hours. To this solution was added 0.06 milliliters of one normal (1N) hydrochloric acid and 0.034 milliliters of deionized water. This solution was stirred under nitrogen for two hours prior to use. The solution was then spin coated onto a transparent $WO_3$ coated tin oxide glass substrate. The $Ta_2O_5$ overcoat (selective ion transport layer) was cured at room temperature in an atmosphere of 50% relative humidity for 12 hours. The device was then assembled as described in comparative example 1. The performance of the device was as follows:

When a potential of +1.3 V was applied to the device (the negative lead being connected to the tungsten oxide coated electrode), its transmittance (measured at 550 nm) changed from 75% T to 4% T in about 180 seconds. The current in the colored state was 2 mA for an area of 45.5 cm$^2$ (44 $\mu$A/cm$^2$). When the power source was disconnected, the transmission of the device went back from 4% T to 10% T in about 180 seconds, but when the cell was shorted, its transmission went back from 4% T to 75% T in about 180 seconds.

EXAMPLE 2

LiNbO$_3$ overcoated WO$_3$ Electrode and Ferrocene Electrolyte

A similar device was made as described in comparative example 1, but the WO$_3$ electrode was overcoated with a thin film of LiNbO$_3$. The LiNbO$_3$ precursor solution was prepared by the addition of 0.8 milliliters of 2,4-pentanedione to dry ethanol followed by 3.0 milliliters of niobium ethoxide. This solution was stirred under dry nitrogen for approximately 3 hours. Then 1.2 grams of lithium 2,4-pentanedionate dissolved in 24 milliliters of dry methanol was added. The solution was stirred under nitrogen and filtered through a 0.5 micron Millipore filter. The solution was spin coated onto a transparent WO$_3$ coated tin oxide glass substrate. The thickness of the LiNbO$_3$ coating was between 500 to 600 angstroms. The coating was cured at room temperature. The device was then assembled as described in comparative example 1. The performance of the device was as follows:

When a potential of +1.3 V was applied to the device (the negative lead being connected to the tungsten oxide coated electrode), the device's transmittance (measured at 550 nm) changed from 74% T to 12% T in about 180 seconds. The steady state current in the colored state was 5.5 mA for an area of 45.5 cm$^2$ (121 $\mu$A/cm$^2$). When the power source was disconnected, the transmission of the device went back from 12% T to 48% T in about 180 seconds, but when the cell was shorted, its transmission went back from 12% T to 74% T in about 180 seconds.

EXAMPLE 3

SiO$_2$ Thin Film Overcoated on WO$_3$ Electrode and Ferrocene Electrolyte

A similar device was made as described in comparative example 1, except that the WO$_3$ electrode was overcoated with a thin film of SiO$_2$. The SiO$_2$ overcoat was deposited by spin coating with a 1 volume percent solution of tetraethoxysilane in dry ethanol. The overcoated WO$_3$ electrode was cured at room temperature prior to assembling into a cell as described in comparative example 1. The performance of the device was as follows:

When a potential of +1.3 V was applied to the device (the negative lead being connected to the WO$_3$ coated electrode), its transmittance (measured at 550 nm) changed from 77% T to 11% T in about 90 seconds. The current in the colored state was 7.39 mA for an area of 45.5 cm$^2$ (162 $\mu$A/cm$^2$). When the power source was disconnected, its transmission went back from 11% T to 41% T in about 120 seconds. When shorted in the colored mode the cell went from 11% T to 75% T in about 120 seconds.

EXAMPLE 4

Polyvinylbutyral (PVB) Overcoated WO$_3$ Electrode and Ferrocene Electrolyte

A similar device was made as described in comparative example 1, except that the WO$_3$ electrode was overcoated with a 5000 Å film spin coated from a 5% solution of polyvinylbutyrate (PVB) (B-73) (available from Monsanto Chemical Company, St. Louis, Mo.) and 0.1M LiClO$_4$ in ethanol. The coating was left to air dry after spinning deposition. The device was then assembled as described in comparative example 1 except for the elimination of PMMA in the electrolyte. The performance of the device was as follows:

When a potential of +1.3V was applied to the device (the negative lead being connected to the coated WO$_3$ electrode), its transmittance (measured at 550 nm) changed from 60.0% T to 42.5% T in about 14 seconds. The current, measured after one hour in the colored state, was 0.006 mA for an area of 45.5 cm$^2$ (0.13 $\mu$A/cm$^2$). When the power source was disconnected, the device's transmittance was unchanged after 2 hours. When a potential of −0.7V was applied the transmittance of the device went back from 40.2% T to 59% T in about 100 seconds.

EXAMPLE 5

Polystyrenesulphonate Sodium Salt (PSSNa) Overcoated WO$_3$ Electrode and Ferrocene Electrolyte A similar device was made as that described in comparative example 1, but the WO$_3$ electrode was overcoated with a 4500 Å polymer film spin coated from a 5% solution of 500,000 MW PSSNa and 0.1M LiClO$_4$ in 88% aqueous formic acid. After spinning, the coating was allowed to air dry. The device was then assembled as described in comparative example 1. The performance of the device was as follows:

When a potential of +1.3V was applied to the device (the negative lead being connected to the coated WO$_3$ electrode), its transmittance (measured at 550 nm) changed from 78% T to 12% T in about 40 seconds. The current, measured after one hour in the colored state, was 0.011 mA for an area of 45.5 cm$^2$ (0.24 $\mu$A/cm$^2$). When the power source was disconnected, the device's transmittance went from 4.4% to 6.1% in 16 hours. When a potential of −0.7V was applied to the device, its transmittance changed from 6.1% T to 78% T in about 180 seconds.

EXAMPLE 6

PSSNa Overcoated WO$_3$ Electrode and Ferrocene Electrolyte

A similar device was made as described in example 5, except that the WO$_3$ electrode was overcoated with a 6000 Å film spin coated from a 5% solution of 500,000 molecular weight PSSNa and 0.2M LiClO$_4$ in formic acid. The electrolyte was prepared with propylene carbonate, 0.1M lithium tetrafluoroborate, 0.05M ferrocene, and 10 wt % PMMA. The performance of the device was as follows:

When a potential of +1.3V was applied to the device (the negative lead being connected to the coated WO$_3$ electrode), its transmittance (measured at 550 nm) changed from 75% T to 10.0% T in about 30 seconds. The leakage current, measured after one hour in the colored state, was 0.015 mA for an area of 45.5 cm$^2$ (0.33 $\mu$A/cm$^2$). When the power source was disconnected, the device's transmittance went from 4.6% T to 15.8% T in 16 hours at 50° C. When a potential of −0.7V was applied to the device, its transmittance changed from 8.0% T to 60.0% T in about 130 seconds.

EXAMPLE 7

PSSNa overcoated $WO_3$ Electrode and Ferrocene Electrolyte

A similar device to that described in example 5 was made, except that the $WO_3$ electrode was overcoated with a 4500 Å film spin coated from a 5% solution of 500,000 MW PSSNa and 0.1M $LiClO_4$ in formic acid and the electrolyte contained 0.5M tetrabutylammonium tetrafluroborate and 5 wt % Uvinul 3,000 (available from BASF). The performance of the device was as follows:

When a potential of +1.3V was applied to the device (the negative lead being connected to the coated $WO_3$ electrode), its transmittance (measured at 550 nm) changed from 76% T to 14.4% T in about 40 seconds. The leakage current, measured after one hour in the colored state, was 0.009 mA for an area of 45.5 cm$^2$ (0.2 $\mu$A/cm$^2$). When the power source was disconnected, the device's transmittance went from 4.4% T to 6.4% T in 16 hours. When a potential of −0.7V was applied to the device, its transmittance changed from 6.3% T to 65% T in about 170 seconds.

EXAMPLE 8

PSSNa Overcoated $WO_3$ Electrode and Ferrocene Electrolyte

A similar device to that described in example 5 was prepared, except for the elimination of the PMMA in the electrolyte. The performance of the device was as follows:

When a potential of +1.3V was applied to the device (the negative lead being connected to the coated $WO_3$ electrode), its transmittance (measured at 550 nm) changed from 78% T to 6.9% T in about 30 seconds. The current, measured after one hour in the colored state, was 0.03 mA for an area of 45.5 cm$^2$ (0.66 $\mu$A/cm$^2$). When the power source was disconnected, the device's transmittance went from 1.7% T to 5.9% T in 16 hours. When a potential of −0.7V was applied to the device, its transmittance changed from 4.9% T to 73% T in about 95 seconds.

EXAMPLE 9

PSSLi Overcoated $WO_3$ Electrode and Ferrocene Electrolyte

A similar device was made as described in example 6, except that the $WO_3$ electrode was overcoated with a 4500 Å film spin coated from a 5% solution of 70,000 MW, polystyrenesulphonate lithium salt (PSSLi) and 0.1M $LiClO_4$ in formic acid. The performance of the device was as follows:

When a potential of +1.3V was applied to the device (the negative lead being connected to the coated $WO_3$ electrode), its transmittance (measured at 550 nm) changed from 75.2% T to 10.0% T in about 17 seconds. The leakage current, measured after one hour in the colored state, was 0.02 mA for an area of 45.5 cm$^2$ (0.44 $\mu$A/cm$^2$). When the power source was disconnected, the device's transmittance went from 3.5% T to 10.6% T in 8 hours. When a potential of −0.7V was applied to the device, its transmittance changed from 2.7% T to 57% T in about 95 seconds.

EXAMPLE 10

Figure 3:
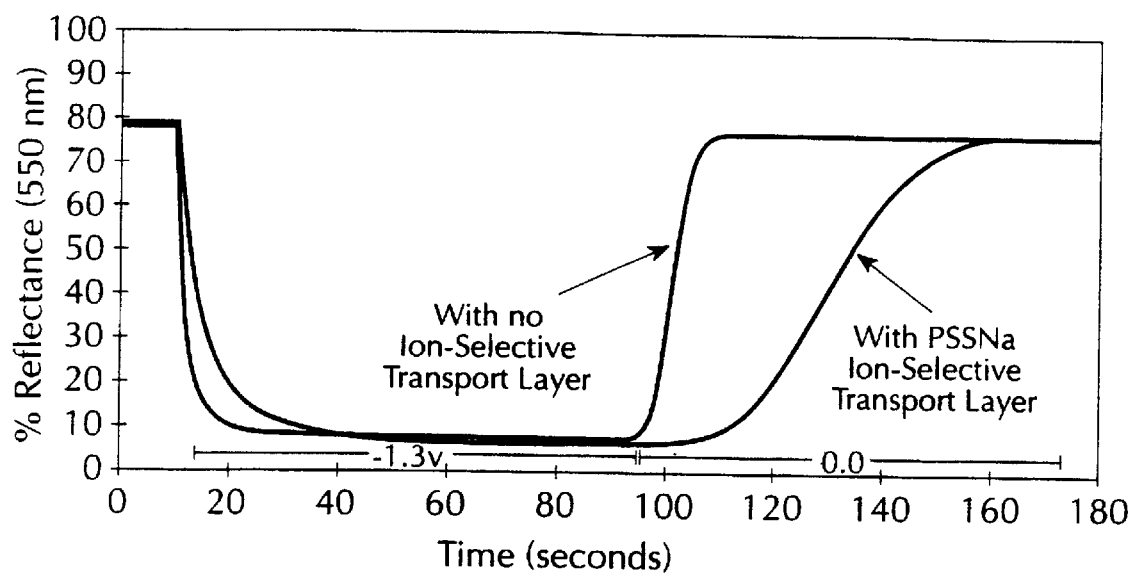
FIG. 3 is a graph of a kinetic trace of 88 $\mu$m ferrocene electrolyte mirrors with and without a polystyrenesulphonate sodium salt (PSSNa) selective ion transport layer.
Figure 4:
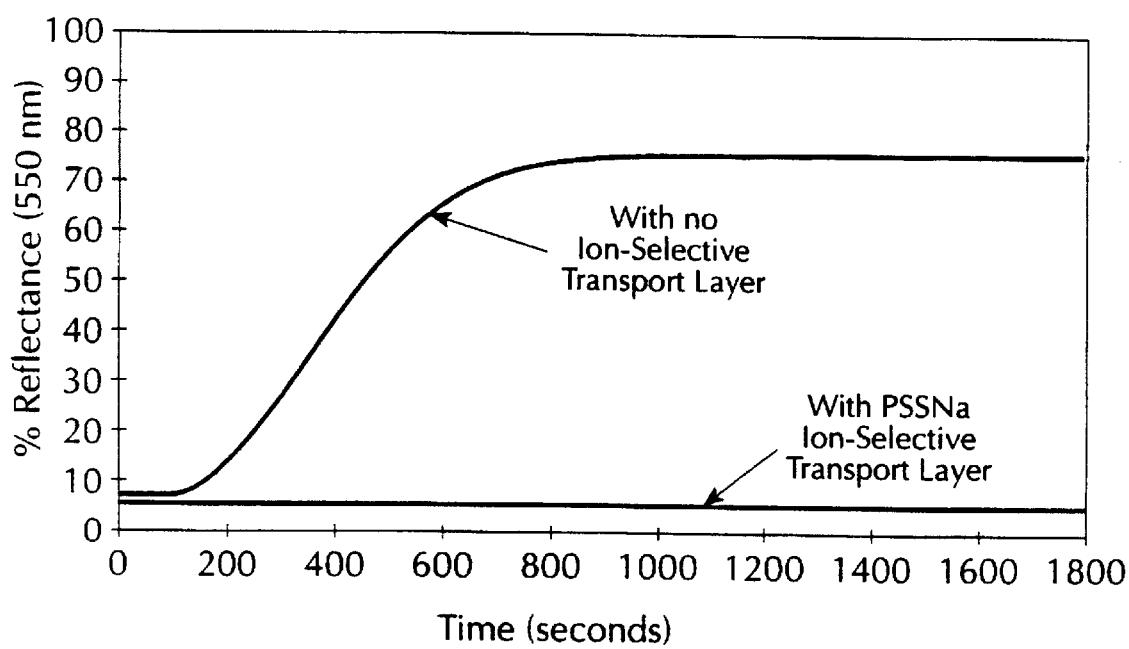
FIG. 4 is a graph of an open circuit memory test of 88 $\mu$m ferrocene electrolyte mirrors with and without a polystyrenesulphonate sodium salt (PSSNa) selective ion transport layer.

$WO_3$ Electrode and Ferrocene Electrolyte: 88 Micron Mirror Device With and Without PSSNa Overcoated $WO_3$ A similar device was made as described in comparative example 1, but the epoxy glue contained 88 micron glass bead spacers rather than 210 micron spacers and the uncoated electrode (opposing the ion selective transport layer) had a mirror coating on its nonconductive side. In addition, a similar 88 micron mirror cell was made but with an overcoat of PSSNa, i.e., an ion selective transport layer, on the $WO_3$ as shown in example 5. In both of these cells, the ferrocene electrolyte did not contain PMMA. The performance of the device was as follows:

When a potential of +1.3V was applied to the device with the PSSNa overcoat (with the negative lead attached to the $WO_3$ electrode), its reflectance (measured at 550 nm) changed from 78.7% T to 8.3% T in about 30 seconds. For the same conditions applied to the comparative device with no overcoat, a reflectance change of 80.4% T to 15.8% T was seen. The reflectance kinetic traces are shown in FIG. 3. The current of the overcoated device, measured after one hour in the colored state, was 0.16 mA for an area of 45.5 cm$^2$ (3.5 $\mu$A/cm$^2$). For the device with no overcoat this current was measured at 38.71 mA (835 $\mu$A/cm$^2$). When the power source was disconnected, the reflectance of the overcoated, i.e., an ion selective transport layer, device did not increase after thirty minutes. After two hours, the reflectance increased from 5.5% to 6.4% as seen in FIG. 4. For the comparative mirror with no overcoat a reflectance increase from 15.8% T to 76.6% T was seen in about 80 seconds as illustrated in FIG. 4.

EXAMPLE 11

$WO_3$ Electrode and Ferrocene Electrolyte: 88 Micron Transmissive Device With and Without PSSNa Overcoated $WO_3$ Devices were constructed as described in example 10, except that a transparent conductor was used instead of a mirrored reflective one. The performance of the cells were as follows:

When a potential of +1.3V was applied to the device with the PSSNa overcoat, i.e., an ion selective transport layer (with the negative lead attached to the $WO_3$ electrode), its transmittance (measured at 550 nm) changed from 79.2% T to 9.0% T in about 30 seconds. For the same conditions applied to the device with no overcoat, a transmittance change of 80.4% T to 15.4% T was observed. Current measurements were identical to those in example 10 for both devices. When the power source was disconnected, the transmittance of the overcoated device did not increase in 30 minutes. For the comparative device with no overcoat a transmittance increase from 15.4% T to 80.4% T was seen in 80 seconds.

EXAMPLE 12

$WO_3$ Electrode and Ferrocene Electrolyte: 37 and 53 Micron Transmissive Devices With and Without PSSNa Overcoated $WO_3$ Electrochromic cells were constructed using similar electrodes as described in Example 11, with the exception that the electrolyte thickness was reduced to two thicknesses of 37 and 53 microns ($\mu$m), respectively. The electrolyte composition was a solvent with 60% propylene carbonate, 40% sulfolane (by weight), and 0.01 molar $LiClO_4$, 0.04 molar $LiBF_4$, 0.05 molar ferrocene, 5% (by weight of solvent) Uvinul 3000 (from BASF) and 1% (by weight of solvent) water. These cells were evaluated in the same manner as described in Example 11. The results are shown in the table below.

|  | 37 $\mu$m, no overcoat | 37 $\mu$m, with overcoat | 53 $\mu$m, no overcoat | 53 $\mu$m, with overcoat |
|---|---|---|---|---|
| High end, % transmission | 77 | 77.3 | 76.7 | 77.2 |
| Low end, % transmission | 35.5 | 13.6 | 29 | 7.1 |
| Time to color (seconds) from high to 20% transmission at 1.3 volts | 10 sec. to 36.5% T | 16 | 19 | 19 |
| Current in the fully colored state (mA) at 1.3 volts | 55 | 0.008 | 47 | 0.008 |
| Current in the fully colored state ($\mu A/cm^2$) at 1.3 volts | 1209 | 0.18 | 1033 | 0.18 |
| % Transmission after full coloration and 10 second open circuit time | 77 | 13.6 | 59.4 | 7.2 |
| % Transmission after full coloration and 30 minute open circuit time | 77 | 13.6 | 76.7 | 7.8 |
| Time to bleach after shorting (seconds)* | 5 | 36 | 9 | 58 |
| Time to bleach (seconds) to within 2% high end at −0.7 volts | 4 | 17 | 6 | 27 |

*Two conductive substrates of each cell were electrically shorted with a copper wire

EXAMPLE 13

$WO_3$ Electrode and Ferrocene Electrolyte: 37 Micron Transmissive Devices With and Without PSSNa Overcoated $WO_3$ Electrochromic cells with a thickness of 37 microns ($\mu$m) were constructed using similar electrodes as described in Example 11. The electrolyte composition was a solvent with 60% propylene carbonate, 40% sulfolane (by weight), and 0.02 molar $LiClO_4$, 0.08 molar $LiBF_4$, 0.1 molar ferrocene, 5% (by weight of solvent) Uvinul 3000 (from BASF) and 1% (by weight of solvent) water. These were evaluated in the same manner as described in Example 12 and the data is shown in the table below.

|  | 37 $\mu$m, no overcoat | 37 $\mu$m, with overcoat |
|---|---|---|
| High end, % transmission | 76.1 | 76.7 |
| Low end, % transmission at 1.3 volts | 38.5 | 4.4 |
| Time to color (seconds) from high to 20% transmission at 1.3 volts | 12 sec. to 39.0% T | 13 |
| Current in the fully colored state (mA) at 1.3 volts | 66 | 0.015 |
| Current in the fully colored state ($\mu A/cm^2$) at 1.3 volts | 1451 | 0.33 |
| % Transmission after full coloration and 10 second open circuit time | 77 | 4.4 |
| % Transmission after full coloration and 30 minute open circuit time | 77 | 4.4 |
| Time to bleach within 2% of high end after shorting (seconds)* | 5 | 60 |
| Time to bleach (seconds) to within 2% high end at −0.7 volts | 3 | 20 |

*The two conductive substrates of the cell were electrically shorted with a copper wire

EXAMPLE 14

PSSNa Overcoated $WO_3$ Electrode; Coating Made From Ethanol/Water Solution

A similar device was made as described in Example 5, except that the $WO_3$ electrode was overcoated with a 6000 Å film dip coated from a 3.5% solution of Mw500,000 polystyrene sulfonate (PSSNa) and 0.01% Triton® X-100 (non-ionic surfactant) surfactant (available from Union Carbide, Danbury, Conn.) in 50% aqueous ethanol. The $WO_3$ electrode was first washed with deionized water and blown dry with $N_2$ to clean the surface. The coating was dipped in a dry atmosphere with an IR lamp directed at the substrate as it was raised out of the dipping solution. The cell was filled with an electrolyte consisting of propylene carbonate, 0.05 M $LiClO_4$ 0.05 M ferrocene, 10 wt % polymethylmethacrylate (PMMA) and 1.0% $H_2O$. The performance of the device was as follows:

When a potential of +1.3 V was applied to the device (the negative lead being connected to the coated $WO_3$ electrode), its transmittance (measured at 550 nm) changed from 79.2% T to 9.0% T in about 120 seconds. The current, measured after one hour in the colored state was 0.0420 mA for an area of 45.5 $cm^2$ (0.93 $\mu A/cm^2$). When the power source was disconnected, the device's transmittance went from 6.18% T to 16.8% T in 8 hours. When a potential of −0.7 V was applied to the device, its transmittance changed from 7.7% T to 77.9% T in about 180 seconds.

EXAMPLE 15

$CH_3(OCH_2CH_2)_nOCONH(CH_2)_3Si(OC_2H_5)_3/Si(OCH_3)_4$ Overcoated $WO_3$ Electrode and Ferrocene Electrolyte 75.00 g of poly(ethylene glycol) methyl ether, $CH_3(OCH_2CH_2)_nOH$, (average Mw=350, obtained from Aldrich Chemical Co.), 58.31 g of 3-(triethoxysilyl) propyl isocyanate, $(C_2H_5O)_3Si(CH_2)_3NCO$, and 0.15 ml of dibutyltindilaurate were heated at approximately 50° C. under nitrogen, with stirring, for 2 hrs to give a silylated derivative with the nominal formula: $CH_3(OCH_2CH_2)_nOCONH(CH_2)_3Si(OC_2H_5)_3$.

5.40 g of $CH_3(OCH_2CH_2)_nOCONH(CH_2)_3Si(OC_2H_5)_3$, 2.76 g of $Si(OCH_3)_4$, 11.02 g of $CH_3OH$ and 1.31 g of $H_2O$ (acidified to 0.15M HCl) were combined and refluxed for 2 hrs. The solution was then cooled and filtered through a 1 μm syringe filter. It was then spincoated on a transparent $WO_3$ coated tin oxide glass substrate. The coating was cured at 135° C. for 1 hr under a humid atmosphere. After this treatment it had a thickness of 1.5–1.6 μm. A device was then assembled as described in comparative Example 1 and filled with an electrolyte consisting of propylene carbonate, 0.5 M $LiClO_4$, 0.05M ferrocene, 10 wt % PMMA and 1.0% $H_2O$. The performance of the device was as follows:

When a potential of +1.3V was applied to the device (the negative lead being connected to the $WO_3$ electrode), its transmittance (measured at 550 nm) changed from approximately 73% T to 6% T in 90 seconds. The current, measured after 15 mins in the colored state, was 0.153 mA for an area of 45.5 $cm_2$ (3.36 $\mu A/cm_2$).

EXAMPLE 16

$CH_3(OCH_2CH_2)_nOCONH(CH_2)_3Si(OC_2H_5)_3/Ta(OC_2H_5)_5$ Overcoated $WO_3$ Electrode and Ferrocene Electrolyte 5.40 g of $CH_3(OCH_2CH_2)_nOCONH(CH_2)_3Si(OC_2H_5)_3$ (prepared as described in Example 15), 10.94 g of $C_2H_5OH$ and 0.33 g of $H_2O$ (acidified to 0.15M HCl) were combined and refluxed for 30 mins. The solution was then cooled and 7.37 g of $Ta(OC_2H_5)_5$ was added and the resulting solution refluxed for 90 mins. The solution was then cooled and filtered through 1 μm syringe filter. It was then spin-coated on a transparent $WO_3$ coated tin oxide glass substrate. The coating was cured at 135° C. for 1 hr under a humid atmosphere. After this treatment it had a thickness of 2.4–2.5 μm. A device was then assembled as described in comparative Example 1 and filled with an electrolyte consisting of propylene carbonate, 0.05 M $LiClO_4$, 0.05M ferrocene, 10 wt % PMMA and 1.0% $H_2O$. The performance of the device was as follows:

When a potential of +1.3V was applied to the device (the negative lead being connected to the $WO_3$ electrode), its transmittance (measured at 550 nm) changed from approximately 79% T to 11% T in 90 seconds. The current, measured after 15 mins in the colored state, was 0.079 mA for an area of 45.5 $cm^2$ (1.74 $\mu A/cm^2$).

EXAMPLE 17

$CH_3(OCH_2CH_2)_nOCONH(CH_2)_3Si(OC_2H_5)_3/Si(OCH_3)_4/NH_2(CH_2)_3Si(OC_2H_5)_3$ Overcoated $WO_3$ Electrode and Ferrocene Electrolyte 16.20 g of $CH_3(OCH_2CH_2)_nOCONH(CH_2)_3Si(OC_2H_5)_3$ (prepared as described in Example 15), 33.06 g of $C_2H_5OH$ and 1.47 g of $H_2O$ (acidified to 0.15M HCl) were combined and refluxed for 30 mins. The solution was then cooled and 8.28 g $Si(OCH_3)_4$ was added and the resulting solution refluxed for 60 minutes. The solution was then cooled and 3.92 g of $H_2O$ (acidified to 0.15M HCl) was added and the resulting solution refluxed for 60 mins. The solution was then cooled and 0.30 g of $NH_2CH_2CH_2CH_2Si(OC_2H_5)_3$ added. After 30 mins the resulting solution was diluted 1:1 (by weight) with ethanol and filtered through a 1 μm syringe filter. It was then spin-coated on a transparent $WO_3$ coated tin oxide glass substrate. The coating was cured at 135° C. for 1 hr under a humid atmosphere. After this treatment it had a thickness of 0.5 μm. A device was then assembled as described in comparative Example 1 and filled with an electrolyte consisting of propylene carbonate, 0.05 M $LiClO_4$, 0.05M ferrocene, 10 wt % PMMA and 1.0 $H_2O$. The performance of the device was as follows:

When a potential of +1.3V was applied to the device (the negative lead being connected to the $WO_3$ electrode), its transmittance (measured at 550 nm) changed from approximately 81% T to 4% T in about 90 seconds. The current, measured after 15 mins in the colored state, was 0.95 mA for an area of 45.5 $cm^2$ (2.09 $\mu A/cm^2$).

Other variations and modifications of this invention will be obvious to those skilled in this art. This invention is not to be limited except as set forth in the following claims.

What is claimed is:

1. An electrochromic device comprising a conducting electrode opposing a counter electrode with (i) an electrochemically active material layer, (ii) a selective ion transport layer and (iii) an electrolyte containing at least one redox active material, wherein said electrochemically active material layer, said selective ion transport layer and said electrolyte are sequentially disposed between said conducting electrode and said counter conducting electrode and at least one of said electrodes is transparent.

2. An electrochromic device according to claim 1, further comprising a first substrate disposed on an outwardly facing surface of one of said electrodes and a second substrate disposed on an other outwardly facing surface of said electrodes, wherein at least one of said substrates is transparent.

3. An electrochromic device according to claim 1, wherein at least one of the electrochemically active material layer or the redox active material is electrochromic.

4. An electrochromic device according to claim 1, wherein said electrolyte contains at least one ionic material.

5. An electrochromic device according to claim 1, wherein the electrolyte contains a mixture of salts having different cations or anions.

6. An electrochromic device according to claim 1, wherein the electrolyte contains water.

7. An electrochromic device according to claim 1, wherein the redox active material is a viologen salt, ferrocene or derivatives thereof.

8. An electrochromic device according to claim 1, wherein the selective ion transport layer is comprised of a selective ion transport material selected from the group consisting of hydrated oxides, non-hydrated oxides, polycerams, or ion-conducting polymers.

9. An electrochromic device according to claim 1, wherein the selective ion transport layer is comprised of a selective ion transparent material that is a sulfonic acid containing polymer.

10. An electrochromic device according to claim 9, wherein protons of said sulfonic acid containing polymer are at least partially replaced by at least one of lithium ions or sodium ions.

11. An electrochromic device according to claim 1, wherein the electrochemically active material layer contains an additive selected from group consisting of UV stabilizers, adhesion promoting agents, heat stabilizers and mixtures thereof.

12. An electrochromic device according to claim 1, wherein the electrolyte contains an additive selected from group consisting of UV stabilizers, heat stabilizers and mixtures thereof.

13. An electrochromic device according to claim 1, wherein the electrolyte is comprised of a mixture of at least two solvents.

14. An electrochromic device according to claim 1, wherein the electrolyte contains a passive visible or infrared dye.

15. An electrochromic device according to claim 1, wherein the electrolyte is comprised of an inert polymeric additive.

16. An electrochromic device according to claim 1, wherein the electrolyte is comprised of a solid polymeric material.

17. An electrochromic device according to claim 1, wherein the electrolyte is comprised of at least one monomer which is polymerizable to a solid after exposure to heat or radiation.

18. An electrochromic device according to claim 1, wherein the electrolyte contains at least one additive selected from the group consisting of inert organic oxide fillers, inorganic sulfate fillers, inorganic carbonate fillers, inorganic pigments, organic pigments, surfactants and dispersing agents.

19. An electrochromic device according to claim 1, wherein the electrochemically active material layer is electrochromic.

20. An electrochromic device according to claim 1, wherein the electrochemically active material layer is selected from the group consisting of an inorganic oxide, a copolymer, a blend and a composite, wherein said copolymer, said blend or said composite contains at least one electrochemically active compound.

21. An electrochromic device according to claim 20, wherein the inorganic oxide is tungsten oxide or doped tungsten oxide.

22. An electrochromic device according to claim 21, wherein said doped tungsten oxide is doped with at least one of lithium, sodium, potassium, molybendum, vanadium or titanium.

23. An electrochromic device according to claim 1, wherein the electrochemically active material layer is electronically conductive in at least its oxidized or reduced state.

24. An electrochromic device according to claim 1, wherein the electrochemically active material layer is selected from the group consisting of polyaniline, a polyaniline derivative and mixtures thereof.

25. An electrochromic device according to claim 1, wherein the at least one transparent electrode is comprised of a group selected from doped indium oxide, doped tin oxide and doped zinc oxide.

26. An electrochromic device according to claim 2, wherein the at least one transparent substrate is selected from the group consisting of specific colored substrates, photochromic substrates, infrared absorbing substrates, reflecting substrates, ultraviolet absorbing substrates and mixtures thereof.

27. An electrochromic device according to claim 2, wherein the at least one transparent substrate is further comprised of a coating on the outward facing surface, said coating selected from the group consisting of an antireflection coating, an antifogging coating, an antiabrasion coating, an ultraviolet quenching coating and mixtures thereof.

28. An electrochromic device according to claim 2, wherein at least one of the substrates is further comprised of a coating, tape or lamination selected from the group consisting of an antilacerative, an antiscatter, a colored, a ultraviolet blocking, an IR blocking coating, tape or lamination and mixtures thereof.

29. An electrochromic device according to claim 2, wherein one of said substrates is reflective.

30. An electrochromic device according to claim 2, further comprising a reflective layer disposed on an inward or outward facing surface of one of said substrates.

31. An electrochromic device according to claim 1, wherein one of said electrodes is a reflective material.

32. An electrochromic device according to claim 2, wherein said device is a vehicular mirror or a vehicular glazing.

33. An electrochromic device according to claim 32, wherein said vehicular mirror is an interior vehicular mirror or an exterior vehicular mirror.

34. An electrochromic device according to claim 33, wherein said interior vehicular mirror is a rearview mirror.

35. An electrochromic device according to claim 32, wherein said vehicular glazing is selected from the group consisting of a vehicular window, a sun roof, sun visor and a shadeband.

36. An electrochromic device according to claim 2, wherein said device is an architectural glazing selected from the group consisting of an exterior window, an interior portion, a skylight and a light tube.

37. An electrochromic device according to claim 2, wherein said device is a filter for a display or monitor.

38. An electrochromic device according to claim 2, wherein said device is a display.

39. An electrochromic device according to claim 2, wherein said device is eyewear or sunglasses.

40. An electrochromic device according to claim 1, wherein said selective ion transport layer is prepared by the process of depositing a liquid medium comprising a selective ion transport material and a solvent on the electrochemically active material layer and evaporating said solvent.

41. An electrochromic device according to claim 40, wherein the selective ion transport material is selected form the group consisting of hydrated oxides, non-hydrated oxides, polycerams or ion-conducting polymers.

42. An electrochromic device according to claim 41, wherein said ion conducting polymers are selected from copolymers containing ion-conductive moieties or non-ionic polymers.

43. An electrochromic device according to claim 40, wherein said liquid medium comprises a surfactant.

* * * * *

UNITED STATES PATENT AND TRADEMARK OFFICE
CERTIFICATE OF CORRECTION

PATENT NO. : 6,178,034 B1
DATED : January 23, 2001
INVENTOR(S) : Pierre M. Allemand et al.

It is certified that error appears in the above-identified patent and that said Letters Patent is hereby corrected as shown below:

Title page,
Item [56], References Cited, U.S. PATENT DOCUMENTS,
"4,435,408" should read -- 4,435,048 --; and
"Agawal et al." should read -- Agrawal et al. --; and Item [57], ABSTRACT,
Line 5, "there" should read -- their --.

Column 1,
Line 30, "doner" should read -- donor --.

Column 2,
Line 59, "stated" should read -- state --.

Column 7,
Line 19, "Eastmann" should read -- Eastman --.

Column 11,
Line 42, "10 $\mu$m" should read -- 10nm --; and
Line 43, "on to" should read -- onto --.

Column 12,
Line 51, "Filing" should read -- Filling ---.

Column 13,
Line 18, "device" should read -- devices --.

Column 14,
Line 41, "Tungsten" should read -- tungsten --.

UNITED STATES PATENT AND TRADEMARK OFFICE
CERTIFICATE OF CORRECTION

PATENT NO. : 6,178,034 B1
DATED : January 23, 2001
INVENTOR(S) : Pierre M. Allemand et al.

It is certified that error appears in the above-identified patent and that said Letters Patent is hereby corrected as shown below:

Column 22,
Line 1, "1.0 $H_2O$." should read -- 1.0% $H_2O$. --.

Signed and Sealed this

Twenty-sixth Day of February, 2002

Attest:

Attesting Officer

JAMES E. ROGAN
Director of the United States Patent and Trademark Office